United States Patent [19]

Voigt, Jr. et al.

[11] 4,012,245

[45] Mar. 15, 1977

[54] CAST TNT EXPLOSIVE CONTAINING POLYURETHANE ELASTOMER WHICH IS FREE FROM OILY EXUDATION AND VOIDS AND UNIFORMLY REMELTABLE

[75] Inventors: H. William Voigt, Jr., Stanhope, N.J.; Lawrence W. Pell, St. Simon's Island, Ga.; Jean P. Picard, Morristown, N.J.

[73] Assignee: The United States of America as represented by the Secretary of the Army, Washington, D.C.

[22] Filed: Mar. 8, 1976

[21] Appl. No.: 664,798

Related U.S. Application Data

[63] Continuation of Ser. No. 475,078, May 31, 1974, abandoned.

[52] U.S. Cl. .............................. 149/19.4; 149/19.8; 149/19.9; 149/92; 149/105
[51] Int. Cl.² .......................................... C06B 45/10
[58] Field of Search ................ 149/18, 19.4, 19.8, 149/19.9, 92, 105

[56] References Cited

UNITED STATES PATENTS

| 3,141,294 | 7/1964 | Lawrence et al. | 149/19.5 |
| 3,447,980 | 6/1969 | Voigt | 149/19.4 |
| 3,554,820 | 1/1971 | Evans | 149/19.4 |
| 3,706,609 | 12/1972 | Voigt et al. | 149/105 |
| 3,745,076 | 7/1973 | Sickman et al. | 149/105 |
| 3,785,889 | 1/1974 | Voganay et al. | 149/105 |
| 3,792,003 | 2/1974 | Duchesne | 149/19.4 |

*Primary Examiner*—Edward A. Miller
*Attorney, Agent, or Firm*—Nathan Edelberg; A. Victor Erkkila

[57] ABSTRACT

A castable explosive containing TNT, which in solidified form is essentially free from oil exudation and voids and can be remelted and reused without loss of homogeneity and explosive properties, is produced by incorporating in the molten TNT explosive a polyurethane elastomer-producing system containing an organic polyisocyanate, a hydroxyl-terminated butadiene polymer liquid resin and an abietyl alcohol.

7 Claims, No Drawings

CAST TNT EXPLOSIVE CONTAINING POLYURETHANE ELASTOMER WHICH IS FREE FROM OILY EXUDATION AND VOIDS AND UNIFORMLY REMELTABLE

This is a continuation of application Ser. No. 475,078, filed May 31, 1974 now abandoned.

BACKGROUND OF THE INVENTION

Castable explosive compositions containing technical grade 2,4,6-trinitrotoluene (TNT), when cast in artillery shells, etc., often exhibit undesirable properties, such as exudation of oily impurities on storage, cavitation, brittleness, cracking, poor adhesion to the case, etc., which adversely affect ballistic performance and sensitivity of the cast to impact. In the past various methods have been proposed for overcoming such disadvantageous properties, but these have been only partially successful. For example, U.S. Pat. No. 3447980 discloses that solid cast TNT explosives which are essentially free from exuding oils and voids, are less brittle and possesses superior compressive strength and adhesion to the case, can be obtained by incorporating into the molten TNT compositions a polyurethane elastomeric system consisting of the reaction product of a prepolymer from 2,4-tolylene diisocyanate and 1,4-polybutylene glycol with hydrogenated castor oil. However, the liquid castable compositions are deficient in that they have limited pot life (i.e. require limited melt time and pour time before gellation and irreversible chemical curing of the polyurethane elastomer takes place in the TNT); and the cast compositions obtained therefrom on solidification are also deficient in that they are not uniformly remeltable, that is, on heating above the melting point of TNT, the composition separates into a liquid TNT phase and a solid elastomer phase, which prevents reprocessing to produce a solidified cast of uniform composition and constant explosive characteristics. U.S. Pat. No. 3706609 discloses that cast TNT explosives, which are free from voids and exuding oils and are capable of being remelted and recast while retaining good homogeneity, can be obtained by incorporating into the molten compositions a small amount of nitrocellulose or other thermoplastic cellulosic resin. However, such cast compositions are relatively brittle and possess inferior mechanical strength and adhesion to the artillery case as compared with the compositions containing the aforementioned polyurethane elastomer.

SUMMARY OF THE INVENTION

In accordance with this invention there is provided a castable explosive composition containing TNT, which in liquid form has virtually unlimited pot life and remains homogeneous during melt loading (e.g. between 80° and 105° C.) and solidification; and in solidified cast form is essentially free from exuding oils, cracks and voids, possesses good heat stability, compressive strength and case adhesion, and can be remelted and resolidified repeatedly while remaining homogeneous. More specifically, the invention provides a castable explosive composition which comprises TNT and a polyurethane elastomer-producing system consisting essentially of an organic polyisocyanate, a hydroxyl-terminated polybutadiene liquid resin and an abietyl alcohol.

DESCRIPTION OF THE PREFERRED EMBODIMENTS

Liquid resinous hydroxyl-terminated 1,4-butadiene polymers, which term includes homo- and copolymers, suitable for use in this invention generally possess a hydroxyl functionality of between 2 and 3 and usually a viscosity of between about 50 and about 600 poises at 30° C. Examples of such resins include butadiene homopolymers having hydroxyl values between about 0.7 and 0.8 milliequivalents per gram (meq./g.) and viscosity values between 50 and 200 poises at 30° C.; a butadiene-styrene copolymer containing 75 wt. % butadiene and 25 wt. % styrene and having a hydroxyl value of 0.65 meq./g. and a viscosity of 225 poises at 30° C.; and a butadiene-acrylonitrile copolymer containing 85 wt. % butadiene and 15 wt. % acrylonitrile and possessing a hydroxyl value of 0.60 meq./g. and a viscosity of 525 poises at 30° C. (The hydroxyl value of the polymer =

$$\frac{\text{Hydroxyl Number}}{56.1} \times \frac{\text{Milliequivalents of OH}}{\text{g. of polymer}} = \text{meq./g.})$$

Suitable abietyl alcohols include abietyl alcohol, dehydroabietyl alcohol, dihydroabietyl alcohol, tetrahydroabietyl alcohol and polymeric abietyl alcohols obtained by reduction of the carboxyl group of polymerized abietic acids.

Organic polyisocyanates (which term is understood to include diisocyanates) suitable for use in this invention include aliphatic, aromatic and cycloaliphatic polyisocyanates, e.g. 2,4-tolylene diisocyanate, mixtures of 2,4- and 2,6-tolylene diisocyanates, 4,4'-diphenylmethane diisocyanate, 1,6-hexamethylene diisocyanate and 4,4'-dicyclohexylmethane diisocyanate. Liquid polyurethane prepolymers containing terminal isocyanate groups are preferably employed in this invention. Such prepolymers are obtainable in known manner by reacting an organic polyisocyanate with a polyfunctional alcohol, e.g. 1,4-butanediol, polyethylene glycol, polypropylene glycol, poly-1,4-butylene glycol and mixtures thereof. Particularly suitable liquid isocyanate-terminated polyether polyurethanes are obtained by reaction of 2,4-tolylene diisocyanate with poly-1,4-butylene glycol.

The polyurethane elastomer producing system should be present in an amount from about 0.1 to about 45 percent, and preferably between about 1 and 5 percent, based on the weight of the total TNT composition including the high explosive components, to provide cast TNT products possessing sufficient mechanical strength together with the remeltability, negligible exudation and other properties noted previously. In these compositions up to about 80% of the TNT can be replaced by crystalline high explosives, e.g. cyclotrimethylenetrinitramine (RDX) and cyclotetramethylenetetranitramine (HMX). Generally, the composition should contain at least about 55 weight percent of the high explosive components including TNT so that it will explode rather than merely deflagrate under ordinary initiation procedures.

The proportions of organic polyisocyanate, hydroxyl-terminated polybutadiene liquid resin and abietyl alcohol components employed in the polyurethane elastomer producing system are usually sufficient to provide a ratio of 0.5-1.5 NCO groups, and preferably about 1

NCO group, per OH group present in the butadiene polymer and abietyl alcohol ingredients. Further, the proportions of hydroxyl-terminated butadiene polymer to abietyl alcohol preferably range from about 0.5 to 2 parts by weight of the former per part of the latter.

The castable TNT compositions of this invention can be prepared by uniformly incorporating in molten TNT the polyurethane elastomer-producing system consisting essentially of organic polyisocyanate, hydroxyl-terminated polybutadiene liquid resin and abietyl alcohol, and allowing the liquid mixture to cool and solidify to produce the cast explosive. More specifically, the castable TNT compositions can be prepared by melting the TNT in a mixer heated with jacket steam, charging the urethane elastomer producing ingredients into the molten TNT and agitating the resulting liquid mixture, e.g. for 15–30 minutes or longer, until a homogeneous mass is obtained. The uniform liquid mass thus obtained is then removed from the mixer and poured into suitable containers, e.g. artillery shells or burster tubes, and allowed to cool and solidify. In addition to TNT the compositions can contain finely divided metal fillers, e.g. aluminum, and crystalline high explosives such as trimethylenetrinitramine cyclotetramethylenetetranitramine, which provide compositions of greater explosive power and reduce the tendency of the cast to have cracks and the TNT to melt out and when the cast is stored at elevated temperatures. Small amounts, e.g. 0.1 to 2% by weight based on TNT content, of liquid organic plasticizers, e.g. dioctylphthalate, and liquid polymeric resins, e.g. poly alpha methyl styrene and liquid epoxy resins, e.g. condensation products of epichlorohydrin and Bisphenol A, can be advantageously incorporated in the liquid castable TNT compositions of this invention. Such additives generally promote the production of fine TNT crystals in the cast products, which tends to reduce formation of voids. Additionally, the epoxy resin serves as an acid scavenger.

The incorporation of small amounts of nitrocellulose, e.g. 0.1 to 2% by weight based on the TNT content, in the compositions of this invention is particularly advantageous in that it promotes toughness of the cast products, and reduces exudation.

The liquid castable TNT compositions thus produced possess virtually unlimited pot life and excellent homogeneity during conventional melt-loading operations at between about 80° and 105° C. The cast products produced on solidification are non-brittle or elastomeric, free from cracks or voids, exhibit negligible exudation of oil on storage, and possess excellent resistance to cracking in temperature cycling from −55° to +71° C. as well as thermal stability as shown by standard vacuum stability test at 120° C. Also, crystalline explosives, e.g. RDX and HMX, and metal fillers which may be present, are maintained in stable uniform dispersion in both the liquid and solid TNT compositions so that the explosive characteristics, e.g. detonation velocity, of the cast explosive are maintained. Further, the cast products can be remelted and resolidified repeatedly without loss of homogeneity or explosive properties of the cast explosives. This unexpected and valuable property permits reuse of riser scrap and melting out of the main charge from burster tubes, artillery shells, etc., which in turn provides substantial savings due to lower cost salvage of metal parts and recovery and reuse of the cast explosive.

The following examples provide specific illustrations of the high explosive TNT compositions of this invention. In the examples, the parts and percentages are by weight.

EXAMPLE 1.

100 parts of 2,4,6-trinitrotoluene (solidification point 80.2° C.) were heated with agitation to 90–100° C. While maintaining the molten TNT at 90–100° C. the following were added with agitation:

0.65 part of hydroxyl-terminated polybutadiene homopolymer liquid resin, hydroxyl content, meq./g. = 0.80, moisture 0.05 wt. %, iodine number 398, and viscosity at 30° C. 50 poises, marketed under the tradename Poly bd Liquid Resin R-45 A by the ARCO Chemical Company, Division of Atlantic Richfield Company.

0.8 part of a mixture of tetra-, di- and dehydroabietyl alcohols, sold under the trademark Abitol by the Hercules Chemical Company.

0.2 part of a liquid epoxy resin condensation product of epichlorohydrin and Bisphenol A having an epoxide equivalent of 180-195, marketed by the Shell Chemical Company as "Epon" 828.

thereafter 0.8 part of "Adiprene" L-100, a liquid urethane prepolymer obtained by reacting one mol of poly-1,4-butylene glycol of average mol. wt. about 1000 with about 1.6 mols of mixed 2,4- and 2,6-tolylene diisocyanates as disclosed in U.S. Pat. Nos. 2929800 and 2948691. was stirred in and the resulting mixture was allowed to stand for about an hour at about 85–90° C. The liquid composition thus obtained, which possessed a low viscosity and light yellow color, was poured into cylindrical containers and allowed to solidify. The solid yellow cast products thus obtained were free from cracks and consisted essentially of relatively long, radially oriented, needle-like crystals. Further, the products exhibited good heat stability and freedom from exudation on storage, and possessed excellent mechanical strength and adhesion to the container and a Shore Hardness (ASTM-D676-55T) of D47 at 70° C.

The cast products were remelted and recast without the formation of separate phases. Specifically, when the cast products were remelted and allowed to stand in molten state for 5–6 hours, no phase separation (globules or layer) was observed.

When the Epon 828 was omitted in the procedure of Example 1, a cast product of essentially the same properties was obtained.

By contrast cast products obtained in similar manner by use of polyurethane elastomer from Adiprene L-100 and castor oil polyol according to U.S. Pat. No. 3447980, when remelted yielded a non-homogeneous product containing a layer of rubbery material over the molten TNT and hence was unsuitable for recasting and reuse as military explosive.

EXAMPLE 2.

The procedure of Example 1 was repeated except that 0.6 part of nitrocellulose (12.1% N, RS 1220 sec. viscosity) was additionally incorporated. A more viscous melt was obtained. The cast products obtained on solidification possessed fine rather than long needle crystals and a somewhat more rubbery texture but otherwise essentially the same properties as the cast products of Example 1.

When the procedure of Example 1 was repeated except that the Abitol was omitted, the molten composition after standing for about 2 hours developed a noticeable separation of dark scum. Similar results were obtained when 1.3 parts rather than 0.65 part of the said butadiene homopolymer was employed.

EXAMPLE 3.

The procedure of Example 1 was repeated except that the following ingredients and amounts were used:
  100 parts of TNT
  0.8 part of hydroxyl-terminated butadiene-styrene copolymer liquid resin, hydroxyl content, meq./g. 0.65, moisture content 0.05%, iodine no. 335, viscosity at 30° C. 225 poises, marketed as Poly bd Liquid Resin CS-15 by the ARCO Chemical Company.
  0.8 part Abitol
  0.2 part Epon 828
  0.6 part nitrocellulose (12% N, RS 1000 sec. viscosity)
  0.8 part Adiprene L-100

The solid cast thus obtained possessed the following Shore Hardness: at 71° C., D42 (tough); at 20° C., D50 (tough); at −40° C., D55 (tough). It was essentially non-crystalline or microcrystalline, yielded flexible, non-brittle shavings, and exhibited little shrinkage during solidification, excellent heat stability and negligible oil exudation on extended storage at 71° C.

The remelted product was a uniform, homogeneous liquid, which on solidification produced a product exhibiting the same characteristics as the initial cast product.

EXAMPLE 4.

The procedure of Example 3 was repeated except that the following ingredients and amounts were employed.
  70 parts of RDX
  30 parts of TNT
  0.3 part of Poly bd Liquid Resin CS-15
  0.3 part of Abitol
  0.05 part of Epon 828
  0.15 part of nitrocellulose (12% N, RS 1000 sec. viscosity)
  0.3 part of Adiprene L-100

The cast product thus obtained is identified as Cast A in the table below.

A control cast composition consisting of 70 parts of RDX and 30 parts of TNT is identified as Cast B in the table.

A control cast composition, prepared from 70 parts of RDX, 30 parts of TNT and 3 parts of Adiprene L-100 and castor oil curing agent as described in U.S. Pat. No. 3447980, is identified as Cast C in the table.

either the cast composition B containing no additive or the cast composition C incorporating the urethane elastomer system according to U.S. Pat. No. 3447980. Further, the cast composition A was remelted and resolidified without the formation of a separate phase whereas the cast product C obtained according to U.S. Pat. No. 3447980, when remelted, exhibited separation of a layer of the polyurethane elastomer.

The foregoing disclosure is merely illustrative of the principles of this invention and are not to be interpreted in a limiting sense. We wish it to be understood that we do not desire to be limited to exact details of construction shown and described for obvious modifications will occur to a person skilled in the art.

What is claimed is:

1. A castable high explosive composition which is essentially free from oily exudation on storage and voids and can be remelted and resolidified essentially without loss of homogeneity and explosive properties, which consists essentially of an explosive component consisting essentially of 2,4,6-trinitrotoluene and up to about 80% by weight of the explosive component of at least one crystalline explosive of the group cyclotrimethylenetrinitramine and cyclotetramethylenetetranitramine, and from about 0.1 to 5 weight percent of a polyurethane elastomer-producing system consisting essentially of an organic polyisocyanate, a hydroxyl-terminated 1,4-butadiene polymer liquid resin of hydroxyl functionality between 2 and 3, and an abietyl alcohol.

2. The composition of claim 1, wherein the explosive component includes about 0.1 to 2 weight percent of nitrocellulose based on the content of 2,4,6-trinitrotoluene.

3. The composition according to claim 1, wherein the organic polyisocyanate is a liquid isocyanate-terminated polyether polyurethane obtained by the reaction of tolylene diisocyanate with poly-1,4-butylene glycol.

4. The composition according to claim 1, wherein the resin is a hydroxyl-terminated butadiene homopolymer of hydroxyl content between about 0.7 and 0.8 meq./g.

5. The composition according to claim 1, wherein the resin is a hydroxyl-terminated butadiene-styrene copolymer of hydroxyl content 0.65 meq./g.

6. The composition according to claim 1, wherein the polyurethane elastomer producing system amounts to between about 1 and 5 weight percent of the composition.

7. The composition according to claim 1, wherein the amount of hydroxyl-terminated resin is between about

| Composition | A | B | C |
|---|---|---|---|
| Exudation at 71° C. 5 days | 0.022% | 0.174% | 0.03% |
| Exudation at 71° C. 10 days | 0.052% | 0.281% | — |
| Exudation at 71° C. 14 days | 0.079% | 0.313% | — |
| Exudation at 71° C. 120 days | no surface encrustation | no surface encrustation | white surface encrustation of needle crystals |

As is evident from the table, the cast composition A containing the polyurethane elastomer system according to this invention, exhibited less oil exudation than 0.5 and 2 parts by weight per part of the abietyl alcohol.

* * * * *